(12) United States Patent
Kleinknecht et al.

(10) Patent No.: US 6,499,413 B2
(45) Date of Patent: Dec. 31, 2002

(54) SEED PLANTING DEVICE AND SEED DRILL USING SUCH DEVICES

(75) Inventors: Christoph Kleinknecht, Allemagne (DE); Joachim Muller, Allemagne (DE); Jean Klein, Dossenheim-sur-Zinsel (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/812,548

(22) Filed: Mar. 21, 2001

(65) Prior Publication Data

US 2002/0043199 A1 Apr. 18, 2002

(30) Foreign Application Priority Data

Mar. 28, 2000 (FR) .............................. 00 03906

(51) Int. Cl.[7] .............................. A01C 7/20; B65G 53/58
(52) U.S. Cl. ...................... 111/174; 221/278
(58) Field of Search ................... 111/77, 164, 174–176, 111/900; 406/168, 191, 192; 221/278, 211; 222/630; 239/727, 734

(56) References Cited

U.S. PATENT DOCUMENTS

| | | | |
|---|---|---|---|
| 3,964,639 A | | 6/1976 | Norris et al. |
| 4,162,811 A | * | 7/1979 | Hobbs .......................... 406/94 |
| 4,669,922 A | | 6/1987 | Hooper et al. |
| 4,949,656 A | * | 8/1990 | Lyle et al. ................... 111/174 |
| 5,392,722 A | | 2/1995 | Snipes et al. |
| 5,522,328 A | | 6/1996 | Long |
| 6,082,276 A | | 7/2000 | Klein et al. |

FOREIGN PATENT DOCUMENTS

EP 0 829 193 A1 3/1998

* cited by examiner

Primary Examiner—Robert E. Pezzuto
(74) Attorney, Agent, or Firm—Oblon, Spivak, McClelland, Maier & Neustadt, P.C.

(57) ABSTRACT

A device for planting seeds in the ground having an inlet orifice via which an airstream transporting seeds arrives, an outlet orifice via which the seeds are planted in the ground and a separating device. The separating device includes a grating which lies substantially in the continuation of the airstream and seed inlet orifice so that a maximum of the air escapes through this grating and the seeds are held back.

22 Claims, 5 Drawing Sheets

SEED PLANTING DEVICE AND SEED DRILL USING SUCH DEVICES

BACKGROUND OF THE INVENTION

1. Field of the Invention

The present invention relates to a device for planting seeds in the ground, comprising an inlet orifice which is connected to a pipe via which an airstream transporting the seeds arrives, an outlet orifice via which said seeds are planted in the ground and a device for separating said seeds from the airstream that transports them.

The invention also relates to a pneumatic seeder equipped with devices as described herein above for planting seeds in the ground.

2. Discussion of the Background

Such a planting device is known from patent application EP 080 912. The device for separating the seeds from the airstream consists of a cyclone. This cyclone is located at the end of a pipe which opens into it tangentially. The stream of air transporting the seeds arrives via this pipe. At its upper part, the cyclone has an orifice via which the air escapes. It is extended downward by a tubulure through which the seeds drop under gravity into the ground. They are therefore not thrown onto the ground by the airstream.

A cyclone such as this is bulky. It is complicated and expensive to produce. In addition, to optimize its operation, a cyclone specially tailored to the size of each type of seed ought to be used, something which is barely possible in practice.

SUMMARY OF THE PRESENT INVENTION

It is an object of the present invention to overcome the aforementioned drawbacks. The invention must, in particular, provide a device for planting seeds with a device for separating the seeds from the airstream that is simple, economical and easy to use for all kinds of seeds usually sown by farmers.

To this end, an important feature of the invention consists in the fact that the separating device comprises a grating which lies substantially in the continuation of said airstream and seeds inlet orifice so that a maximum of the air escapes from the planting device through this grating and the seeds are held back. Said seeds remain in the planting device and drop into the ground under the effect of their own weight, without re-bounding.

Said grating may have an inclined face intersecting the direction of the airstream. This arrangement makes it easier for the air to leave the planting device. Advantageously, at least part of the grating follows the shape of the airstream inlet orifice as closely as possible so as to prevent the seeds from being able to leave the planting device by any route other than via the outlet orifice.

According to another feature of the invention, the device for separating the air and seeds additionally comprises a canalizing device which directs the stream of air and seeds towards the grating. Practically all of the air then leaves directly through said grating. This canalizing device comprises a deflector which spreads the stream of air and seeds over a large proportion of the surface area of the grating.

Another important feature of the invention consists in the fact that the separating device is removable.

The separating device also advantageously comprises a cap which at least partially surrounds the grating. This cap protects said grating and ducts much of the air which has escaped from the planting device toward the rear of the machine.

According to another feature of the invention, the planting device additionally comprises a regulating device which ensures a substantially constant spacing between the seeds leaving via its outlet orifice. This device advantageously lies substantially vertically in line with the grating. It comprises guide elements arranged in a zigzag. It may be interchangeable so that it can be adapted to suit the type (family) of seeds to be sown.

BRIEF DESCRIPTION OF THE DRAWINGS

Other features and advantages of the invention will become apparent from the description which will follow and which refers to the appended drawings which, by way of non-limiting examples, represent a few embodiments of the invention. In these drawings.

DESCRIPTION OF THE PREFERRED EMBODIMENTS

Figure 1:
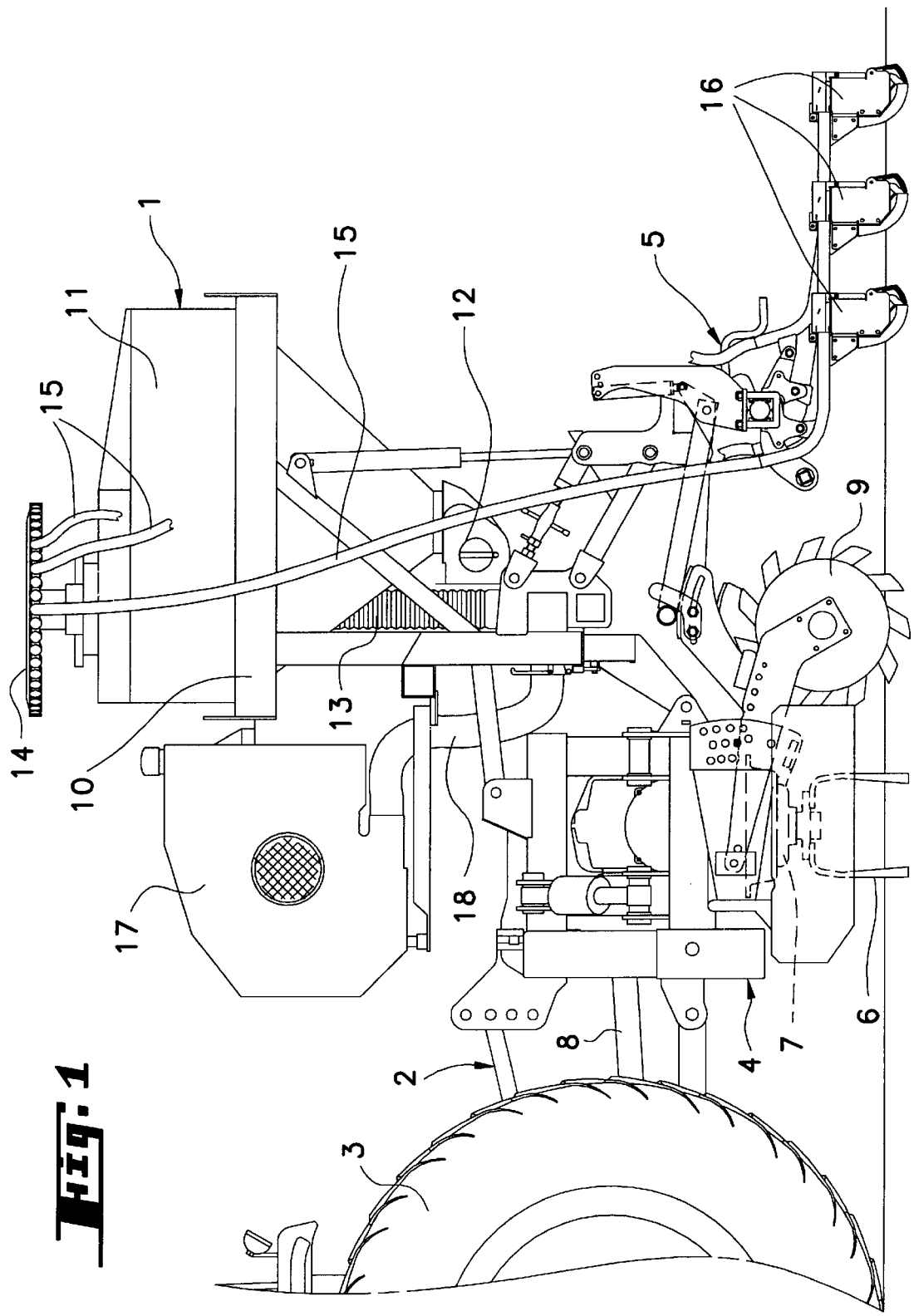
FIG. 1 depicts a side view of a combined soil-working and sowing agricultural machine, hitched to a tractor and comprising devices for planting the seeds in the ground according to the invention.

As depicted in FIG. 1, the combined soil-working and sowing agricultural machine 1 is coupled to the rear hitch 2 of a tractor 3. This machine is made up of an implement 4 for preparing a seed bed and of a seeder 5.

The implement 4 for preparing a seed bed is a rotary harrow. It comprises driven tools 6 which are driven in rotation by means of gearwheels placed in a housing 7. These gearwheels are driven off a power take-off (not depicted) of the tractor 3 via a transmission shaft 8 with universal joints. Arranged to the rear of the tools 6 is a roller 9 for tamping down the worked soil.

The seeder 5 comprises a frame 10 which is connected to the implement 4 for preparing the seed bed. This frame 10 carries a hopper 11 containing the seed. This hopper 11 at its base has a seed metering system 12. This system communicates with a feed column 13 which opens into a distribution head 14 from which there depart pipes 15 leading to seed-planting devices 16 which are arranged at the rear of the roller 9 across the entire width of the machine. These planting devices 16 lie in three rows and are spaced apart in such a way that there are fairly regular intervals between the lines in which the seeds are deposited. The frame 10 of the seeder 5 also carries a blower 17 which produces a stream of air. This airstream is conveyed by a duct 18 to the base of the feed column 13. This stream then carries the seeds from the metering system 12 as far as the distribution head 14 in which it splits into several streams which, with the seeds, enter the pipes 15.

Figure 2:
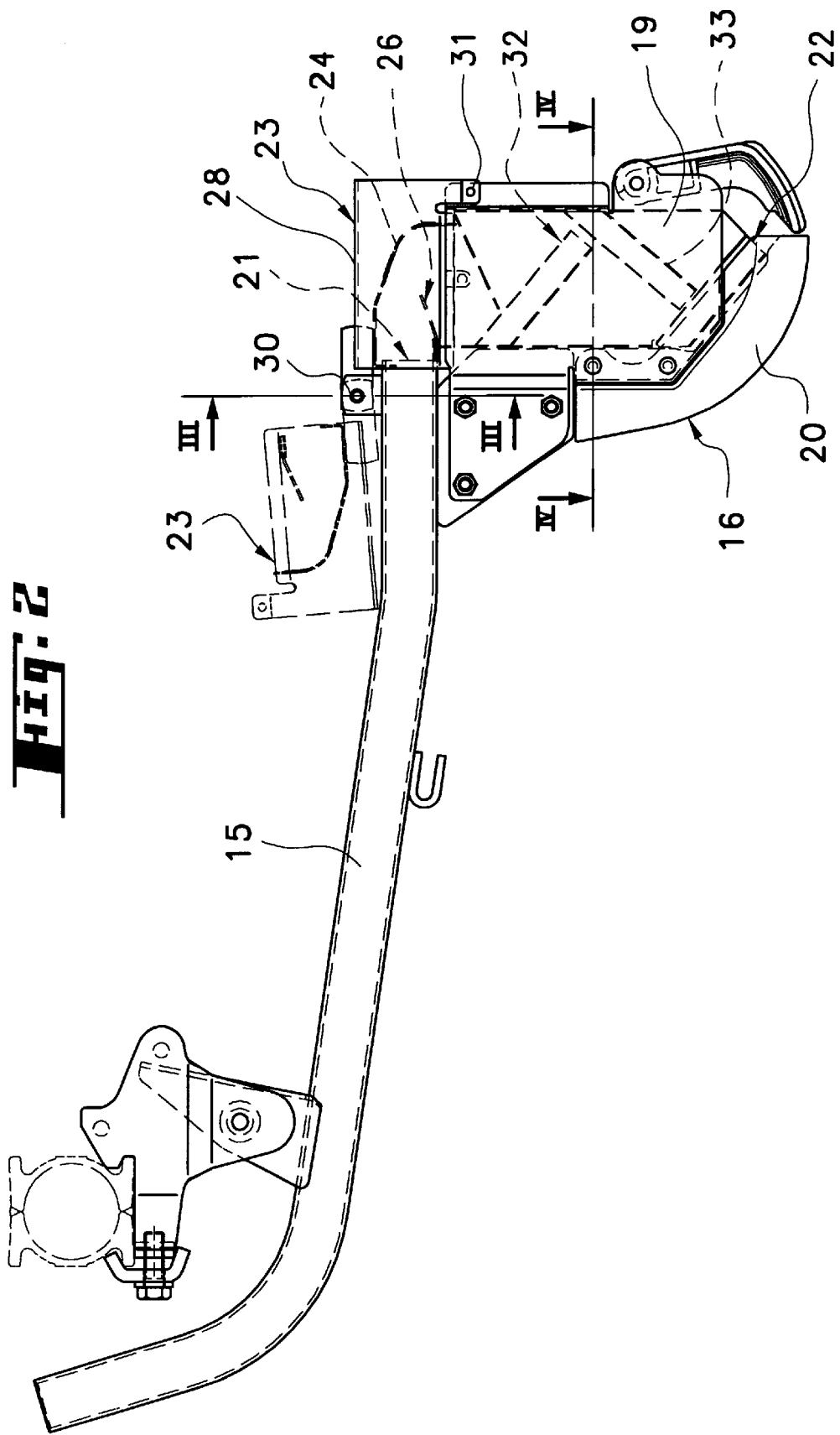
FIG. 2 depicts, on a larger scale, an exemplary embodiment of a planting device.
Figure 3:
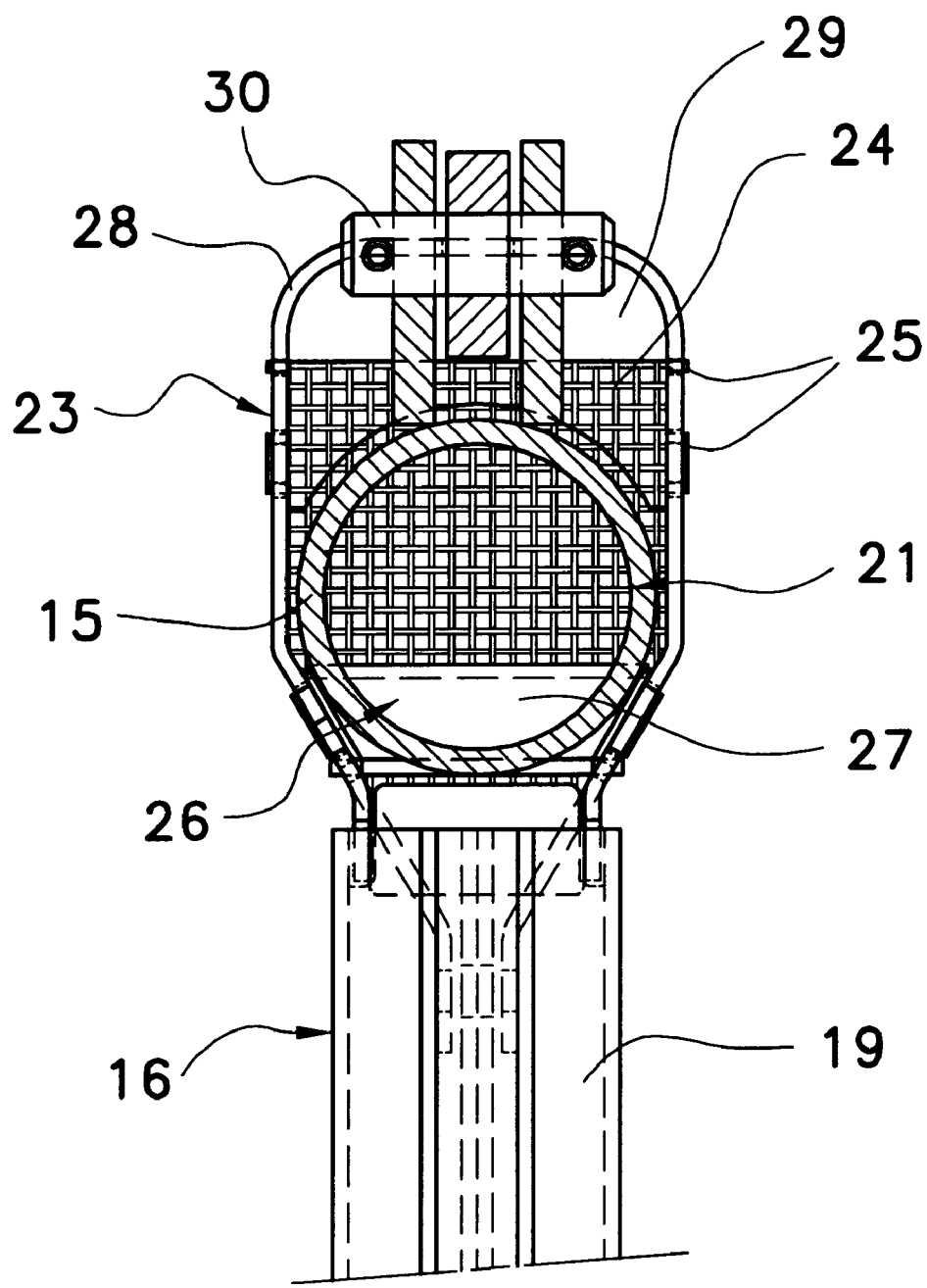
FIG. 3 depicts a section on III—III of FIG. 2.
Figure 4:
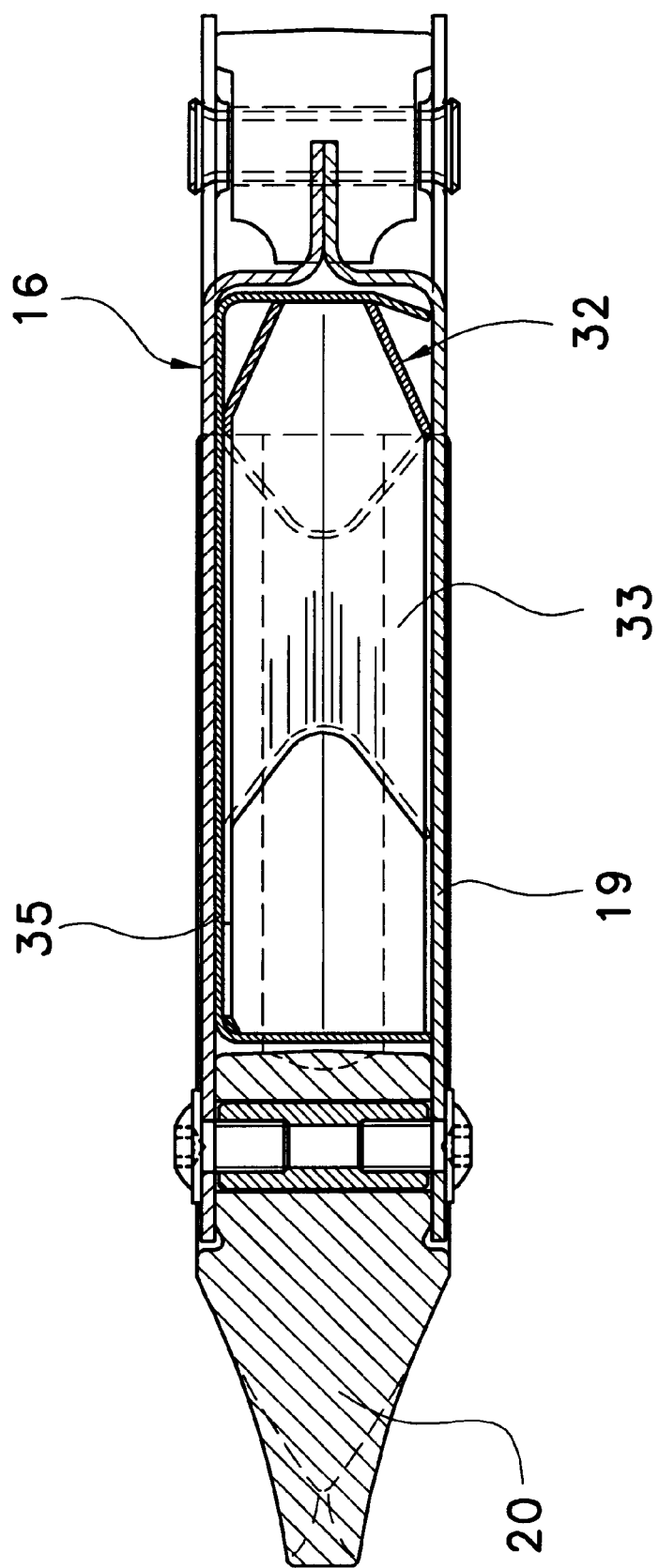
FIG. 4 depicts a section on IV—IV of FIG. 2.

Each planting device 16 is formed by a hollow body 19 in the form of a tube of rectangular cross section (FIGS. 2 and 4). Its front face and its base comprise a part 20 which is tapered so as to be able to open up a small trench in the ground. The upper part of each planting device 16 has an inlet orifice 21 which is connected to a pipe 15 and via which the stream of air transporting the seeds arrives. The lower part of each planting device 16 has an outlet orifice 22 via which said seeds are planted in the ground. Each planting device 16 comprises, between the inlet 21 and the outlet 22, a device 23 for separating said seeds from the stream of air that transports them. This separating device 23 comprises a grating 24 which may be made of metal wire and through which said airstream escapes. This grating 24 has a mesh size which is smaller than the size of the seeds so that the latter are held back inside the planting device 16. Said grating 24 lies substantially in the continuation of said inlet orifice 21 so as to encourage a maximum of air to leave immediately. It has an inclined face intersecting the direction of the airstream. At least part of this grating 24 follows the shape of said inlet orifice 21 as closely as possible so as to prevent seeds being able to leave the planting device 16 by any route other than via the outlet orifice 22 (see FIG. 3).

As shown in FIG. 3, the grating 24 constitutes an interchangeable part. It has cramps 25 which allow it to be fixed and detached easily on or from the planting device 16. If necessary, the user can thus fit gratings which are exactly tailored to the different types of seeds to be sown. This can be done easily because of the small size of the gratings 24 and because of the method of fitting/removal, which is very quick.

The separating device 23 of each planting device 16 also comprises a canalizing device 26 which directs the stream of air and seeds toward the grating 24. This canalizing device 26 comprises a deflector 27 which distributes the stream of air and seeds over a large proportion of the surface area of the grating 24. It lies in the continuation of the bottom part of the inlet orifice 21 and extends backward and upward toward the grating 24. Practically all of the air is thus guided directly toward said grating so that it can escape through it.

The separating device 23 additionally comprises a cap 28 which partially surrounds the grating 24. This cap 28 in particular has an opening 29 toward the rear via which the airstream leaves. In the example of FIG. 3 it acts as a support for the grating 24. It also provides protection against foreign bodies which could damage or block the grating 24.

The assembly that constitutes the separating device 23 is advantageously removable. It can be seen in these FIGS. 2 and 3 that it is articulated by means of an axis 30 on the end of the pipe 15. It could also be articulated directly to the planting device 16. The axis of articulation 30 is located approximately above the inlet orifice 21 of the planting device 16. The separating device 23 can thus be tipped upward into the position depicted in chainline in FIG. 2, which provides access to the inside of the planting device 16. Said separating device 23 can be locked in the closed working position by means of a bolt 31 which extends through orifices made in cramps located on the separating device 23 and on the body 19 of the planting device 16.

The planting device 16 additionally comprises a regulating device 32 which ensures an approximately constant spacing between the seeds leaving the outlet orifice 22. This regulating device 32 is arranged in the body 19, approximately vertically below the grating 24. It comprises guide elements 33 such as gutters, which are arranged in a zigzag from the grating 24 as far as the outlet orifice 22. As depicted in FIG. 4, the guide elements 33 have a V-shaped cross section, with a rounded bottom.

Figure 5:
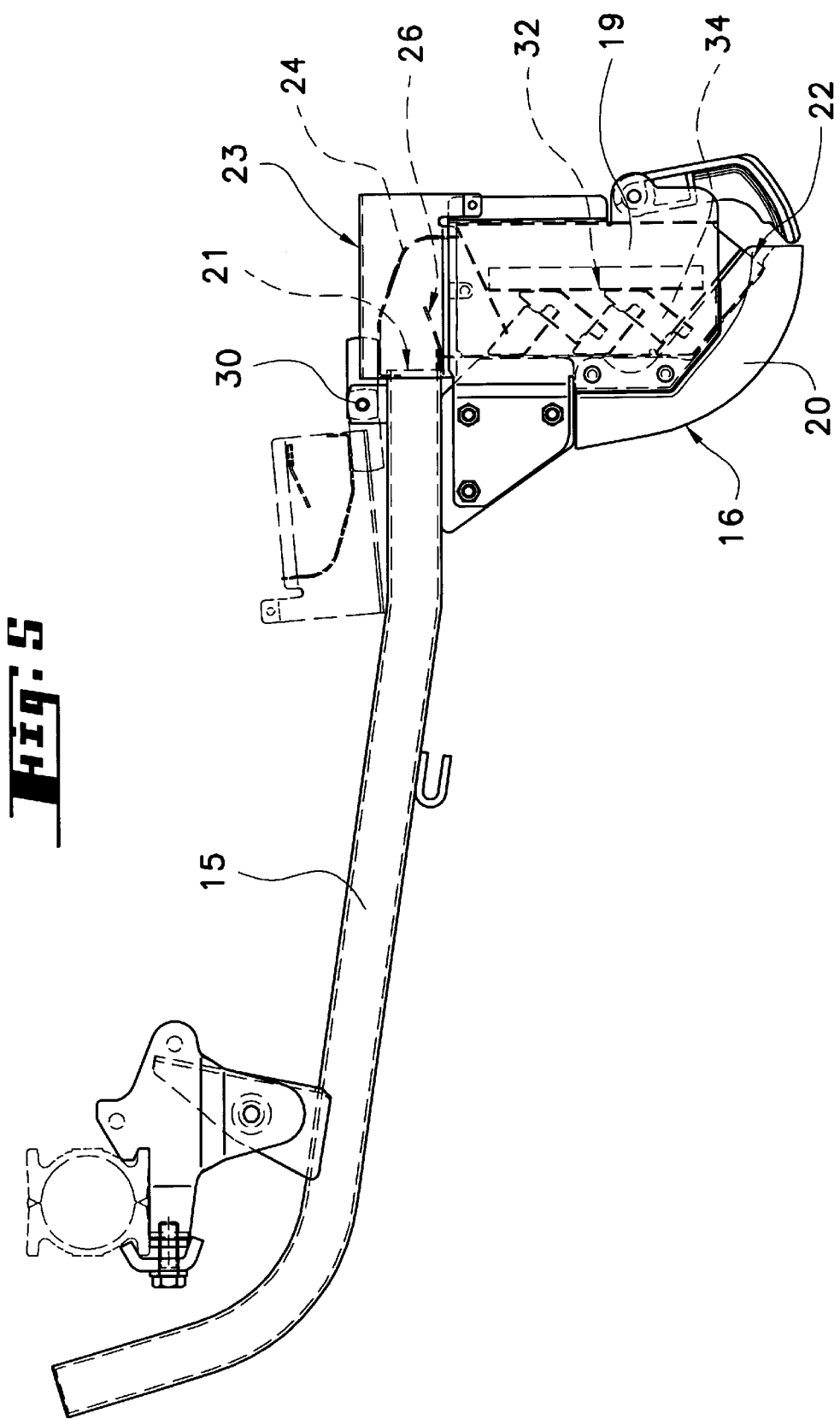
FIG. 5 depicts another exemplary embodiment of the planting device.

The regulating device 32 is advantageously interchangeable, which allows it to be tailored to suit the families of seeds to be sown. In the example of FIG. 2, the guide elements 33 are few in number and extend over practically the entire width of the body 19. In addition, the round bottom is relatively broad. This type of guide element is perfectly suited to the sowing of large-diameter seeds such as peas. The exemplary embodiment of the regulating device 32 which is depicted in FIG. 5 has more gutter-shaped guide elements 34. These elements 34 are not very long and thus occupy only half the width of the body 19. They are suited particularly to the sowing of small-sized seeds. The rounding in the bottom of each guide element may be less pronounced in order to canalize the seeds better. The ends of these guide elements 34 are also closer together to prevent the seeds from rebounding as they pass from one to the other.

The guide elements 33, 34 may be assembled to form kinds of small boxes 35 with substantially the same shape as the bodies 19 of the planting devices 16. They can thus be slid between the side walls of said bodies 19.

In the context of the invention, the implement 4 for preparing the seed bed and the seeder 5 may differ from those described hereinabove. It is also possible for the seed-planting devices 16 to be fitted to a seeder 5 used solo.

During work, the agricultural machine according to FIG. 1 is hitched to the tractor 3 which allows it to be moved over a field and driven. The tools 6 of the implement 4 are dug into the ground and driven in rotation. They therefore loosen the earth in which the seeds will be deposited. The roller 9 runs over the earth. It crushes clumps, compacts the earth and evens out its surface. The planting devices 16 open small furrows in the earth in which the seeds are deposited. The seeds travel from the hopper 11 into the feed column 13, passing via the metering device 12. In said column 13 they are carried along by the airstream produced by the blower 17. This stream arrives at the head 14 which distributes it to the pipes 15. In the latter, the seeds are conveyed as far as the inlet orifices 21 of the planting devices 16. In each of these the airstream and the seeds encounter the deflector 27 which directs them toward the grating 24 and distributes them over a large proportion of its surface area. This surface allows all of the air to pass but holds back the seeds which drop into the regulating device 32 under the effect of their own weight. These seeds then slide from one guide element 33, 34 to the next as far as the outlet orifice 22 where they touch the ground. They thus arrive at constant intervals and at low speed. This prevents them from continuing to roll along the ground and makes it possible to obtain uniform sowing in a simple way.

Quite obviously, the invention is not restricted to the embodiments described hereinabove and depicted in the appended drawings. Modifications remain possible, particularly as regards the construction or number of the various elements or by substituting technical equivalents without in any way departing from the field of protection.

What is claimed as new and desired to be secured by Letters Patent of the United States is:

1. A device for planting seeds in the ground, comprising an inlet orifice which is connected to a pipe and via which an airstream transporting seeds arrives, an outlet orifice via which said seeds are planted in the ground and a device for separating said seeds from the airstream that transports them, wherein said separating device comprises a grating which lies substantially in the continuation of said airstream and seeds inlet orifice so that a maximum of air escapes through this grating and the seeds are held back.

2. Device for planting seeds in the ground as claimed in claim 1, wherein at least part of said grating follows the shape of said inlet orifice as closely as possible so as to prevent the seeds from being able to leave said planting device by any route other than via the outlet orifice.

3. Device for planting seeds in the ground as claimed in claim 1, wherein the grating has an inclined face intersecting the direction of the airstream.

4. Device for planting seeds in the ground as claimed in claim 3, wherein the grating is interchangeable with gratings which are exactly tailored to different types of seeds to be sown.

5. Device for planting seeds in the ground as claimed in claim 1, wherein the separating device additionally comprises a canalizing device which directs the stream of air and seeds toward said grating.

6. Device for planting seeds in the ground as claimed in claim 5, wherein the canalizing device comprises a deflector which spreads the stream of air and seeds over a large proportion of the surface area of the grating.

7. Device for planting seeds in the ground as claimed in claim 6, wherein the inlet orifice has a bottom part and said deflector lies in the continuation of said bottom part.

8. Device for planting seeds in the ground as claimed in claim 7, wherein said deflector extends backward and upward toward said grating.

9. Device for planting seeds in the ground as claimed in claim 5, wherein said separating device is removable.

10. Device for planting seeds in the ground as claimed in claim 9, wherein said separating device is connected to the pipe of the planting device by means of an articulation.

11. Device for planting seeds in the ground as claimed in claim 10, wherein said articulation is located approximately above said inlet orifice.

12. Device for planting seeds in the ground as claimed in claim 11, wherein pivoting of the separating device about said articulation is prevented by means of a bolt.

13. Device for planting seeds in the ground as claimed in claim 10, wherein said separating device additionally comprises a cap which at least partially surrounds said grating.

14. Device for planting seeds in the ground as claimed in claim 1, and which additionally comprises a regulating device which ensures a substantially constant spacing between said seeds leaving said outlet orifice.

15. Device for planting seeds in the ground as claimed in claim 14, wherein said regulating device lies substantially vertically below said grating.

16. Device for planting seeds in the ground as claimed in claim 15, wherein said regulating device comprises guide elements arranged in a zigzag.

17. Device for planting seeds in the ground as claimed in claim 16, wherein said guide elements have a V-shaped cross section.

18. Device for planting seeds in the ground as claimed in claim 17, wherein the bottom of the V is rounded.

19. Device for planting seeds in the ground as claimed in claim 15, wherein said regulating device is interchangeable so that said planting device can be adapted to suit the type of seeds that are to be sown.

20. Device for planting seeds in the ground as claimed in claim 14, and which comprises a hollow body with two side walls extending downward.

21. Device for planting seeds in the ground as claimed in claim 20, wherein said regulating device can be slid between said side walls of the hollow body.

22. A pneumatic seeder comprising at least one device for planting seeds in the ground as claimed in one of claims 1–21.

* * * * *